(12) United States Patent
Hoglund et al.

(10) Patent No.: US 6,820,587 B1
(45) Date of Patent: Nov. 23, 2004

(54) METHOD FOR CONTROLLING A COMBUSTION PROCESS IN A COMBUSTION ENGINE

(75) Inventors: Anders Hoglund, Fjaras (SE); Ulla Sarnbratt, Gothenburg (SE); Ingemar Magnusson, Molndal (SE); Jan Eismark, Gothenburg (SE)

(73) Assignee: AB Volvo, Gothenburg (SE)

( * ) Notice: Subject to any disclaimer, the term of this patent is extended or adjusted under 35 U.S.C. 154(b) by 99 days.

(21) Appl. No.: 10/089,250

(22) PCT Filed: Sep. 29, 2000

(86) PCT No.: PCT/SE00/01893

§ 371 (c)(1),
(2), (4) Date: Aug. 19, 2002

(87) PCT Pub. No.: WO01/23718

PCT Pub. Date: Apr. 5, 2001

(30) Foreign Application Priority Data

Sep. 29, 1999 (SE) .............................................. 9903525

(51) Int. Cl.[7] .................................................. F02B 3/00
(52) U.S. Cl. ........................ 123/299; 123/294; 123/301; 123/568.11; 123/661
(58) Field of Search .................. 123/294, 299, 123/301, 305, 568.11, 661

(56) References Cited

U.S. PATENT DOCUMENTS

| 4,753,213 | A | 6/1988 | Schlunke et al. | 123/533 |
|---|---|---|---|---|
| 5,743,243 | A | 4/1998 | Yanagihara | 123/568.12 |
| 5,899,389 | A | 5/1999 | Pataki et al. | 239/533.2 |
| 5,956,942 | A | 9/1999 | Sebastiano et al. | 60/274 |
| 6,026,786 | A | 2/2000 | Groff et al. | 123/501 |
| 6,073,608 | A | 6/2000 | Krieger et al. | 123/299 |
| 6,394,064 | B1 * | 5/2002 | Nieberding | 123/295 |

FOREIGN PATENT DOCUMENTS

| DE | 195 34 770 | 3/1996 |
|---|---|---|
| EP | 0 844 380 | 5/1998 |
| EP | 0 887 525 | 12/1998 |
| EP | 0 894 960 | 2/1999 |
| EP | 0 905 361 | 3/1999 |
| EP | 0 911 511 | 4/1999 |
| EP | 0 924 416 | 6/1999 |

* cited by examiner

Primary Examiner—Tony M. Argenbright
(74) Attorney, Agent, or Firm—Young & Thompson

(57) ABSTRACT

Process which, by spray-controlled, directly injected combustion with the aid of step-by-step technical development of the whole of the combustion system, achieves an intensified mixing process during injection and after-burning, which speeds up soot oxidation during various stages so effectively that the engine can be run with sufficiently high EGR content for desired NOx and soot content down to ultra-low emissions, at the same time as parameters which control the efficiency are decoupled from measures for desired emission level, thereby enabling optimum efficiency to be attained for the process.

16 Claims, 5 Drawing Sheets

METHOD FOR CONTROLLING A COMBUSTION PROCESS IN A COMBUSTION ENGINE

CROSS REFERENCE TO RELATED APPLICATION

This is the 35 USC 371 national stage of International Application PCT/SE00/01893 filed on 29 Sep. 2000, which designated the United States of America.

FIELD OF THE INVENTION

The present invention relates to a method for controlling the combustion process in a combustion engine. The invention especially relates to such a method for reducing soot emissions and nitrogen oxide emissions (NOx) formed in combustion engines in which the fuel/cylinder gas mixture is ignited by compression heat generated in the cylinder.

BACKGROUND AND PRIOR ART

Nitrogen oxides (Nox) are formed from the nitrogen content in the air in a thermal process which has a strong temperature dependency and depends on the size of the heated-up volume and the duration of the process.

Soot particles are a product which, during combustion, can both be formed and subsequently oxidized into carbon dioxide ($CO_2$). The quantity of soot particles measured in the exhaust gases is the net difference between formed soot and oxidized soot. The process is very complicated. Combustion with fuel-heavy, i.e. rich, fuel/air mixture with poor mixing at high temperature produces high soot formation. If the formed soot particles can be brought together with oxidizing substances such as oxygen atoms (O), oxygen molecules ($O_2$), hydroxide (OH) at sufficiently high temperature for a good oxidation rate, then a greater part of the soot particles can be oxidized. In a diesel engine, the oxidation process is considered to be in the same order of magnitude as the formation, which means that net soot production is the difference between formed quantity of soot and oxidized quantity of soot. The net emission of soot can therefore be influenced firstly by reducing the formation of soot and secondly by increasing the oxidation of soot. Carbon monoxide emissions (CO) and hydrocarbon emissions (HC) are normally very low from a diesel engine. Yet the percentages can rise if unburnt fuel ends up in relatively cool regions. Such regions are, in particular, zones with intense cooling located close to the cylinder wall. Another example is cavities between piston and cylinder lining.

A combustion process in which the fuel is injected directly into the cylinder and is ignited by increased temperature and pressure in the cylinder is generally referred to as the diesel process. When the fuel is ignited in the cylinder, combustion gases present in the cylinder undergo turbulent mixing with the burning fuel, so that a mixture-controlled diffusion flame is formed. The combustion of the fuel/gas mixture in the cylinder gives rise to heat generation, which causes the gas in the cylinder to expand and which hence causes the piston to move in the cylinder. Depending on a number of parameters, such as the injection pressure of the fuel, the quantity of exhaust gases recirculated to the cylinder, the time of injection of the fuel and the turbulence prevailing in the cylinder, different efficiency and engine emission values are obtained.

Conventional combustion engines which work according to the diesel process exhibit relatively high values in terms of discharged emissions, such as nitrogen oxides and soot particles.

It is previously known to reduce the soot particle formation by injecting the fuel early in or prior to the expansion stroke, whilst, at the same time, an ignition delay is sought, so that the fuel has time to be vaporized and be mixed before the fuel is ignited with gases present in the cylinder. There are therefore methods for reducing the content of emissions which are given off from a conventional engine.

In order further to reduce the soot emissions specifically, a known method has been proposed, which entails the fuel being injected directly into the combustion chamber under relatively high injection pressure (up to 2000 bar has been tested) by means of injection devices disposed in the combustion chamber. The high injection pressure results in a high flow rate for the fuel relative to the injection device and the cylinder gas. The high flow rate of the fuel supplies energy to the mixing process between fuel and cylinder gas, which leads to a high mixing rate between these. When the mixing rate is sufficiently high, the chemical reactions between fuel and the cylinder gas which lead to combustion do not have time to occur, so that the combustion occurs farther into the combustion chamber. A large so-called "lift-off" is obtained, i.e. a relatively large distance between the mouth of the injection device and the place downstream in the spray at which the fuel/cylinder gas mixture reacts. The large distance offers the opportunity for more cylinder gas and hence oxygen to be sucked in to the central parts of the spray. The result of the combustion occurring farther into the combustion chamber is that fuel and cylinder gas are mixed to a higher degree prior to combustion. When the mixing rate and the degree of mixing are sufficient, the combustion of the fuel/cylinder gas mixture is realized with a sufficient quantity of oxygen to reduce soot particle formation in the spray. At lower flow rates of the fuel, the oxygen in the cylinder gas is not mixed sufficiently well with the fuel prior to combustion, with the result that much of the combustion is realized with considerable oxygen deficiency. This creates large quantities of soot particles. According to this method, the mixing process between the fuel and the cylinder gas is primarily realized locally in the spray. The drawback with this method is principally that the nitrogen oxide emissions are not sufficiently low, but also the soot emissions can be somewhat too high. Without Exhaust Gas Recirculation, there is a lower limit for the minimum level of nitrogen oxide emissions which are obtainable. Lower nitrogen oxide emissions are most commonly achieved by postponing the time for the start of the injection during a combustion cycle. The later after the upper dead centre of the piston the combustion occurs, the lower the compression temperature. In such a case, combustion is realized at a lower temperature, thereby producing lower nitrogen oxide emissions. However, the postponed start of the injection influences the time available for completion of the combustion. Time available for soot oxidation is reduced for the same reasons. The result is that the soot emissions from the engine increase more and more the later that combustion occurs. This therefore limits the minimum level of nitrogen oxide emissions which can practically be reached without Exhaust Gas Recirculation.

The majority of measures which reduce soot emissions increase the nitrogen oxide emissions. A "trade-off" is talked of, which is typical of the diesel engine, between soot emissions and nitrogen oxide emissions, which "trade-off" is difficult to influence.

In order further to lower the emissions, a known method has been proposed which involves the fuel being injected at low pressure into the charge-air system of the engine during a certain time window, for example during the early part of the induction stroke. During the induction stroke, a large quantity of exhaust gases is also recirculated to the cylinder, this in order to cool down the combustion process to prevent nitrogen oxides from being formed. The formation of nitrogen oxides occurs at high combustion temperatures. The recirculated exhaust gases reduce the concentration of oxygen in the combustion chamber, due to the fact that a considerable proportion of the combustion chamber is taken up by re-introduced exhaust gases. A lesser quantity of oxygen leads to a cooler combustion process, but, at the same time, also to the formation of more soot emissions due to greater risk of local oxygen deficiency. The remaining quantity of oxygen must therefore be more effectively utilized in the reactions with the fuel. The solution to this is to supply more mixing energy, so that the oxygen "hits upon" the fuel. This is done by making the recirculated exhaust gases and newly supplied air flow in a vortex motion, which is generally referred to as swirl, so that an essentially homogeneous mixture of fuel and cylinder gas is formed in the cylinder. When the piston then approaches the upper dead centre position, the homogeneous fuel/gas mixture is heated up by the compression heat generated in the cylinder. Since the fuel is fed into the charge-air system of the engine during the induction stroke, the fuel/gas mixture will be ignited once the entire quantity of fuel has been introduced into the cylinder and once ignition temperature has been reached in the cylinder. This combustion process is usually generally referred to as HCCI (Homogeneous Compression Combustion Ignition). The result is that very low contents of both soot and nitrogen oxide emissions are obtained. The drawback with this method is, however, that the engine can only be run at low loads. The reason is that the combustion of the entire quantity of fuel in a homogeneous fuel/cylinder gas mixture is realized far too rapidly, i.e. over relatively few crank angle degrees, thereby producing a far too rapid or sudden and strength-limiting pressure build-up and a maximum level of pressure in the cylinder. Another drawback is that the fuel/gas mixture located closest to the cylinder walls has time to be cooled and hence is not ignited by the compression heat, or alternatively that fuel which is burning close to the walls of the cylinder is extinguished due to cooling effects close to the walls. This results in some of the fuel condensing on the cylinder walls and passing by the piston. The fuel subsequently runs down into the crank section of the engine and is mixed with the lubricating oil of the engine, resulting in worsened lubricating properties of the oil. A further drawback with this method is that the ignition time for the fuel/cylinder gas mixture is difficult to control, especially with varying load and engine speed. The unburnt fuel/gas mixture also gives rise to the formation of hydrocarbons. Since the combustion process according to this known method is realized at relatively low temperature, the temperature of the exhaust gases will also be low. This has the effect of making the after-treatment of the exhaust gases more difficult, since the low exhaust gas temperature is not always capable of activating a catalyzer disposed in the exhaust gas system.

There is another known method which is a refinement of the method above and which involves the fuel instead being injected directly into the cylinder at a late stage during the compression stroke or early expansion stroke, according to which care is taken to ensure that the fuel/cylinder gas mixture is only ignited once the entire quantity of fuel has been injected into the cylinder. Here the recirculated exhaust gases and newly supplied air are made to flow in a very fast vortex motion, this firstly in order to obtain a homogeneous mixing with the fuel such that the oxygen is utilized effectively and secondly to prevent fuel condensation on the cylinder walls. In order for the mixing to be sufficient, the ignition delay, i.e. the time from the start of the fuel injection up to the ignition of the fuel/cylinder gas mixture, is extended. Here too, the result is that very low emission contents are obtained. Drawbacks with this method are principally that the engine can only be run at low loads, due to the fact that the combustion process of the entire quantity of fuel in a homogeneous fuel/cylinder gas mixture is realized far too rapidly, which produces engine strength problems. Here too, relatively cool exhaust gases are obtained, thereby making after-treatment of the exhaust gases with the aid of a catalyzer more difficult.

The object of the invention is therefore, in the light of the above, to control the combustion process in such a way that very low soot and nitrogen oxide emissions are obtained over the whole of the working range of the engine, i.e. at all loads and also during transient processes, such as, for example, during acceleration. The present invention also breaks the typical "trade-off" (mentioned above) between soot and nitrogen oxide emissions and allows nitrogen oxide emissions to be lowered without increasing the soot emissions. The invention further ensures that high efficiency is achieved and that the cylinder pressure is kept at an acceptably low level.

DESCRIPTION OF THE INVENTION

The method according to the invention involves the spray, during the injection process, supplying a large quantity of kinetic energy and controlling a spray-internal mixing process and supplying kinetic energy to the large-scale global mixing process. At the same time, as a result of the motion and design of the piston, kinetic energy is supplied to the spray-internal and to the global mixing process.

The advantage with this is principally that low soot and nitrogen oxide emissions are obtained.

In a first advantageous embodiment of the method according to the invention, the soot and nitrogen oxide (Nox) emissions and the efficiency of the engine are controlled essentially independently of each other in that the soot emissions are primarily controlled by the quantity of supplied mixing energy and the nitrogen oxide emissions are primarily controlled by the quantity of exhaust gases from earlier combustion processes and the efficiency is primarily controlled by the centre of gravity and duration of the heat release. The advantage with this is that the emission contents and efficiency of the engine can, in principle, be freely chosen.

In an advantageous second embodiment of the method according to the invention, the mixing is carried out locally, since fuel and cylinder gas are mixed in regions upstream of the regions in the spray where combustion takes place and since the injection continues after ignition has been realized, i.e. spray-controlled combustion. The advantage with this is that a more robust combustion process is obtained, which can handle all load ranges, at the same time as ultra-low emission levels are obtained.

In an advantageous third embodiment of the method according to the invention, the mixing is carried out globally, since essentially the entire quantity of fuel corresponding to one combustion cycle is injected and mixed in the cylinder before ignition and combustion are realized. This embodiment, too, can handle all load ranges, at the same time as ultra-low emission levels are obtained. This embodiment has many characteristics in common with HCCI. The essential difference is that the injection method itself creates the necessary mixing. Unlike the prior art, this embodiment can also handle high engine load ranges, at the same time as ultra-low emission levels are obtained without a far too rapid, strength-limiting build-up of pressure in the cylinder. The reason why it has been possible to limit the pressure build-up lies in a combination of a sufficiently large quantity of EGR, sufficiently low temperature and sufficiently low pressure in the cylinder, which limits the rate of the chemical reactions leading to ignition and combustion.

Further advantageous embodiments of the method according to the invention can be gleaned from the appended patent claims.

DESCRIPTION OF THE FIGURES

The present invention will be described in greater detail below with reference to the appended drawings, which, for illustrative purposes, show further preferred embodiments of the invention.

DETAILED DESCRIPTION OF PREFERRED EMBODIMENTS OF THE INVENTION

Figure 1:
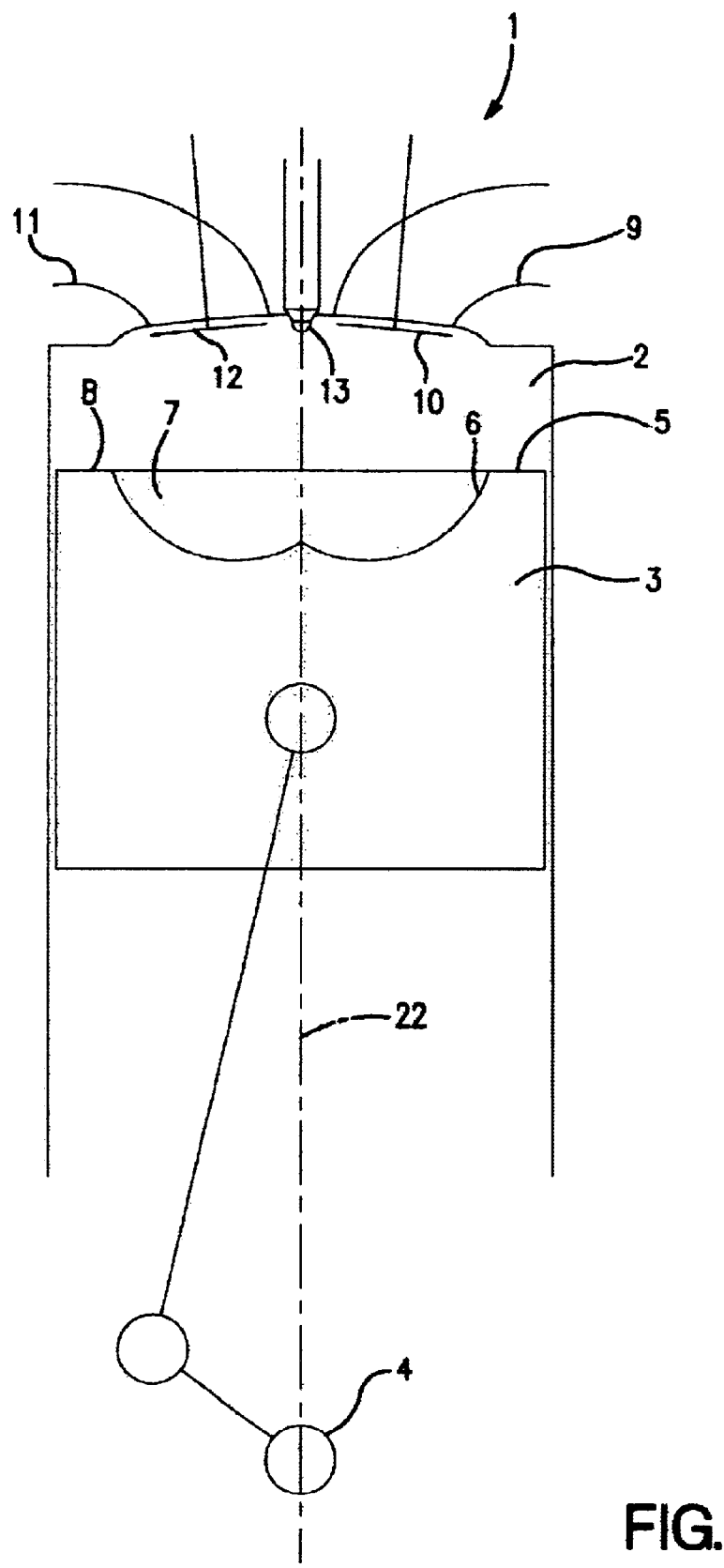
FIG. 1 shows a diagrammatic view of a combustion engine.

In FIG. 1, a diagrammatic view is shown of a combustion engine 1 which is designed to work according to the diesel process. The engine 1 comprises a cylinder 2 and a piston 3, which reciprocates in the cylinder 2 and is connected to a crankshaft 4 so that the piston 3 is set to reverse in the cylinder 2 at an upper and lower dead centre position. The piston 3 is provided in its upper surface 5 with a recess 6, which forms a combustion chamber 7. The upper section of the piston 3 is referred to as the piston top 8. To the cylinder 2 there are coupled one or more induction ports 9. The connection between a respective induction port 9 and the cylinder 2 can be opened and closed with an induction valve 10 disposed in each induction port 9. To the cylinder 2 there are also coupled one or more exhaust ports 11. The connection between a respective exhaust port 11 and the cylinder 2 can be opened and closed with an exhaust valve 12 disposed in each exhaust port 11.

In the cylinder 2 there is disposed at least one fuel injector nozzle 13, through which fuel is injected into the cylinder 2 so that the fuel is mixed with gas compressed in the cylinder 2 to form a fuel/gas mixture, which is ignited by compression heat generated in the cylinder 2.

The combustion engine 1 shown in FIG. 1 comprises a cylinder 2 and works according to the four-stroke principle. The engine 1 preferably comprises a plurality of cylinders 2, each provided with a piston 3, where each piston 3 is connected to a common crankshaft 4. Each cylinder 2 can comprise two pistons 3, so that the engine 1 is thus designed as a twin-piston engine in which the combustion chamber (not shown) is formed between the pistons 3.

Figure 2:
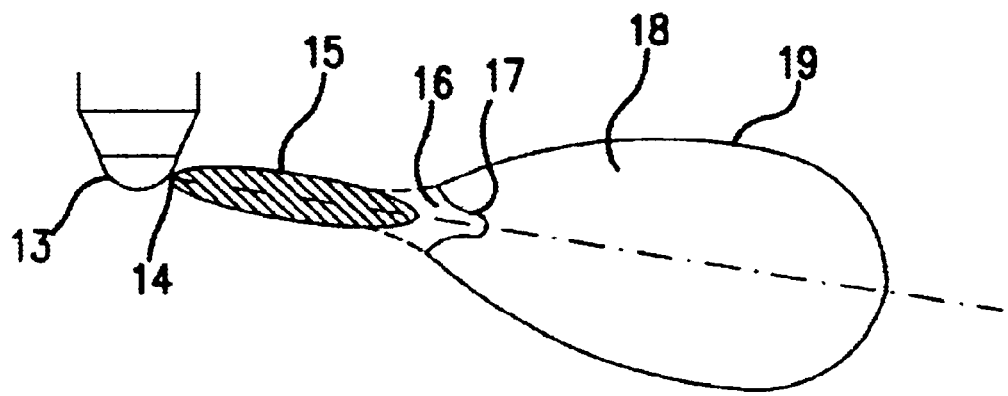
FIG. 2 shows a diagrammatic view of an injector nozzle from which fuel is sprayed according to the prior art.

FIG. 2 shows diagrammatically an injector nozzle 13, from which fuel is sprayed according to the prior art. In FIG. 2, the diagrammatically shown injector nozzle 13 has been provided with only one opening 14. Through the opening 14, fuel is injected into the cylinder 2 of the engine 1. The injected fuel forms a jet 15 (liquid phase), the shape and extent of which in the cylinder 2 depend, inter alia, on the size and shape of the opening 14 in the injector nozzle 13, the instantaneous injection pressure of the fuel and the instantaneous cylinder pressure in the cylinder 2. Downstream of the fuel jet 15, a first region 16 is formed, in which fuel and cylinder gases are initially mixed to form a rich fuel/gas mixture. At the margin 17 of this first region 16, a very fuel-rich mixed flame is generated. After passing through the fuel-rich flame and during its motion away from the injector nozzle 13, the fuel continues to react with in an environment of oxygen deficiency, so that soot particles are formed during the combustion. This oxygen-deficiency-marked combustion takes place in a second region 18 downstream of the fuel jet 15 and also downstream of the first region 16. The burning fuel subsequently travels towards an outer margin 19 of the second region 18, at which a stoichiometric fuel/gas ratio prevails. At this fuel/gas ratio, the main heat release takes place and it is here too that the highest combustion temperature comes about, which results in some of the soot particles which are formed upon the combustion in the second region 18 being combusted when they reach the said outer margin 19 of the second region 18. The references 15, 16, 17, 18, 19 with all their phases are generally referred to as spray.

Figure 3:
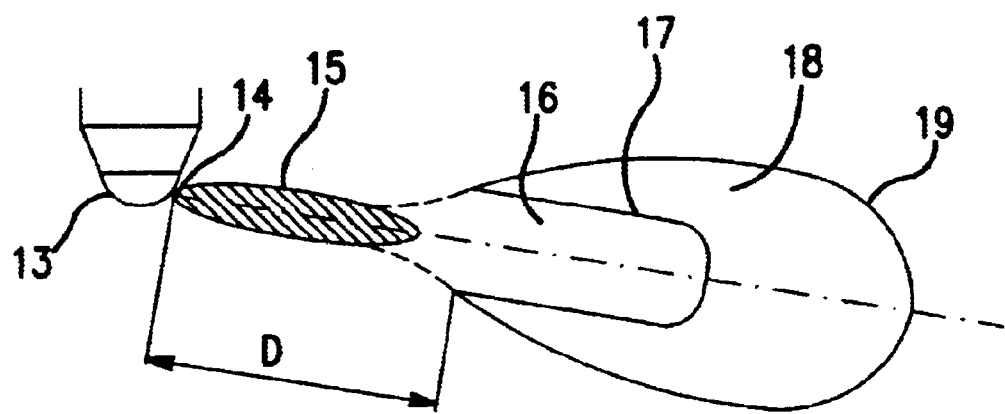
FIG. 3 shows a diagrammatic view of an injector nozzle from which fuel is sprayed with a method according to the present invention.

In order to reduce the soot particle content, the fuel is injected with a method according to the present invention, which will be described in connection with FIGS. 3, 4, 5a and 5b. FIG. 3 shows diagrammatically an injector nozzle 13, from which fuel is sprayed according to the invention. In the same way as in FIG. 2, the diagrammatically shown injector nozzle 13 has been provided with only one opening 14. In FIGS. 2 and 3, the injector nozzle 13 is portrayed on essentially the same scale. Characteristic of the invention is that the spray, during the injection process, supplies a large quantity of kinetic energy and controls a spray-internal mixing process and supplies kinetic energy to the large-scale global mixing process. As a result of the motion and design of the piston, kinetic energy is further supplied to the spray-internal and to the global mixing process. This has the effect that the first region 16 in the spray is enlarged, at the same time as the second region 18 becomes relatively smaller, and that after-oxidation of soot particles is maximized.

The fuel is preferably injected at an injection pressure which is higher than 300 bar, preferably between 1000 and 3000 bar, in order to realize the method. The choice of injection pressure level varies greatly with engine speed and torque output and of the desired quantity of recirculated exhaust gases, which, in turn, controls the nitrogen oxide emission. The flow rate of the fuel injected into the cylinder 2 and the shape of the fuel jet 15 also has the effect that the distance D between the injector nozzle 13 and that part of the outer margin 18 of the second region 18 in which combustion occurs is increased. This distance D is referred to as "lift-off". The increase in this distance D enables a greater proportion of cylinder gases to be transported by the fuel jet in the direction of and into the first region 16 and to be mixed with the fuel. A reduction of the fuel/gas ratio is therefore obtained in the first region 16. This leads to reduced formation of soot, in that the region 18 in which the soot formation occurs is smaller and in that the soot formation occurs in less fuel-rich zones farther from the injector nozzle 13. The greater kinetic energy which is supplied by virtue of the fuel injection and through the motion of the piston leads, moreover, to an effective global mixing of fuel and cylinder gas, resulting in an effective oxidation of those soot particles which are nevertheless formed.

According to the invention, it is possible to control the fuel injection pressure such that it varies during the injection of the fuel into the cylinder 2. Especially good results are obtained if the fuel, at the start of the injection, is injected at the maximum pressure generated during the injection. This pressure is referred to as the opening pressure, since this pressure is generated when the fuel injector nozzle 13 is opened for injection of fuel into the cylinder 2.

Preferably, an injection system (not shown) is chosen which is adapted so as to offer an opening pressure which achieves the maximum pressure generated during the fuel injection. Preferably, the injection system is also designed so that the fuel injection pressure can be controlled such that a variation of the fuel injection pressure is obtained during the injection of the fuel into the cylinder 2. The possibility is thereby obtained of influencing the efficiency of the engine and the soot particle formation, which is to be explained in greater detail below. The quantity of fuel and the flow rate at which the fuel is injected can also be controlled with the aid of the injection is system.

The flow rate of the fuel injected into the cylinder 2 and the shape of the fuel jet from the injector nozzle 13 are dependent, inter alia, on the injection pressure, but also on the size and shape of the opening or openings 14 in the injector nozzle 13 and the prevailing compression in the cylinder 2. The number of openings 14 also has an effect upon the combustion process. The injection must be realized in harmony with the state of the cylinder gas. In a diesel engine, the gas has been compressed around 1.0–25 times, depending on the engine construction. This gives a very high gas density, the molecular density of which is such that sprays, despite high pressure and rates, can be heavily influenced. It is known, for example, that with a certain swirl there is an optimum number of holes when the spray, neither too easily nor with too much difficulty, can get through the gas mass, so-called spray penetration.

An injector nozzle 13 having an opening 14 or having a large number of openings 14 can be used. For example, the injector nozzle 13 can be provided with a porous material, which offers a very large number of openings 14. Preferably, the number of openings 14 is chosen such that the best possible use is made of the available volume and shape of the combustion chamber 7. By making optimum use of the available volume and shape of the combustion chamber 7, the largest possible proportion of airborne combustion of the fuel is obtained. A wall-proximate combustion of the fuel can thus be avoided as far as is practical, which minimizes heat losses during the combustion process and reduces the production of hydrocarbons (HC) and carbon monoxide (CO). The reduced heat losses optimize the thermal efficiency of the engine 1. A description is also given below of a different strategy, in which contact between combustion gases and the walls of the combustion chamber is deliberately used to generate global mixing energy. The direction of the openings 14 in the injector nozzle 13 also has significance for the degree of utilization of the available volume of the combustion chamber 7. An arrangement having double rows of openings 14 in the injector nozzle 13 is conceivable. Preferably, the openings 14 are then arranged in such a way that the fuel jets 15 from the various openings 14 disturb one another. We obtain an increased local mixing of oxygen and fuel in and around the sprays. Each row of openings 14 can also be designed for different measures. For example, one of the rows of openings 14 can be especially adapted for influencing the ignition delay for the fuel. The openings 14 can be designed to diverge, so that a conical fuel jet 15 is created. The openings 14 can also be designed such that a relief or cavitation is created in the opening 14, resulting in increased turbulent energy. The method according to the invention can also be realized with a fuel injector nozzle 13, which mixes air into the fuel jet 15. A further factor which influences the flow rate and shape of the injected fuel is the global gas motion prevailing in the cylinder 2 and the turbulence it creates in the cylinder gases, which will be explained in greater detail below.

The flow rate and shape of the injected fuel in the fuel jet 15 and hence the spray results in cylinder gases being transported by the fuel jet 15 in the direction of the burning fuel/gas mixture in such a way that the mixing rate between the fuel and the cylinder gases is high in the first region 16. A spray-controlled intensified mixing process is thereby obtained, which produces a continuous and increased spray-internal mixing of fuel and cylinder gases. The first region 16 is thereby enlarged, as is shown in FIG. 3. The high mixing rate has the effect that the fuel cannot be ignited. It is only once the mixing rate decreases, which occurs at the outer margin 17 of the first region 16, that the fuel is ignited. According to the invention, the fuel/gas ratio, at the outer margin 17 of the first region 16, is leaner than the fuel/gas ratio prevailing at the outer margin 17 of the first region 16 according to the prior art, as is shown in FIG. 2. The outer margin 17 of the first region 16 is thus moved in the direction downstream of the fuel jet 15 in the second region 18, in which a leaner fuel/gas ratio prevails. This results in a smaller proportion of soot particles being formed when the ignited fuel is travelling in the second region and towards the outer margin 19 of the second region 18, which leads to a large proportion of the formed soot particles burning up at the outer margin 19 of the second region 18.

Due to the high temperature in the cylinder 2, a proportion of the soot particles which do not burn up at the outer margin 19 of the second region 18 will burn up in the cylinder 2 outside the second region 18 or at a later stage after the end of the injection at an arbitrary position in the cylinder 2 at which conditions are present for the oxidation of soot. This kind of combustion of the soot particles is referred to as after-oxidation. The after-oxidation can be enhanced through the supply of more mixing energy, so that remaining oxygen "hits upon" the soot particles. The mixing energy, for the global large-scale mixing, can be supplied in a number of ways. The motion and design of the piston 3 can set the cylinder gas in motion. The shape of the induction port 9, together with the fact that supplied fresh air/exhaust gas mixture is introduced at relatively high speed, can set the cylinder gas in a vortex motion (swirl). Other parts in the combustion chamber can also be designed such that they control the cylinder gas motion in a certain way. Further, the injection characteristics can be used to achieve a global mixing effect which survives as far into the after-burning as possible. Critical to this is the amount of kinetic energy which each spray supplies to the cylinder gas. Given a certain necessary flow capacity for an atomizer, the number of holes is chosen so as to vary the kinetic energy for each hole in order, together with the design of the piston 3, to achieve an optimal gas motion which will survive till after the end of the injection period. For example, a small number of holes produces a larger mass flow per hole and thus greater kinetic energy per spray, given that flow number and other hardware and settings are equal. With the aid of optimization of the piston geometry, spray direction, injection characteristics and gas state of the system, this can be utilized to employ a controlled motion of combustion gases along the walls of the piston 3 to achieve a large-scale global motion with the potential to survive for a while after the end of the injection period. The gas motion along the cylinder wall has the advantage that it creates turbulence, since the cylinder wall forces the gas flow to change direction. The drawback is, however, that considerable heat losses are obtained, producing worse efficiency. Furthermore, in order to increase the after-oxidation, additional multiple fuel injections can be carried out. One or more injections can be executed late during the combustion process. By injecting a small quantity of fuel under very high pressure late in the combustion process, an extra kinetic energy contribution is obtained late during the combustion process, which is translated into turbulence of the burning fuel and cylinder gases. The increased turbulence of the burning fuel and the cylinder gases promotes the after-oxidation of the soot particles.

Figure 4:
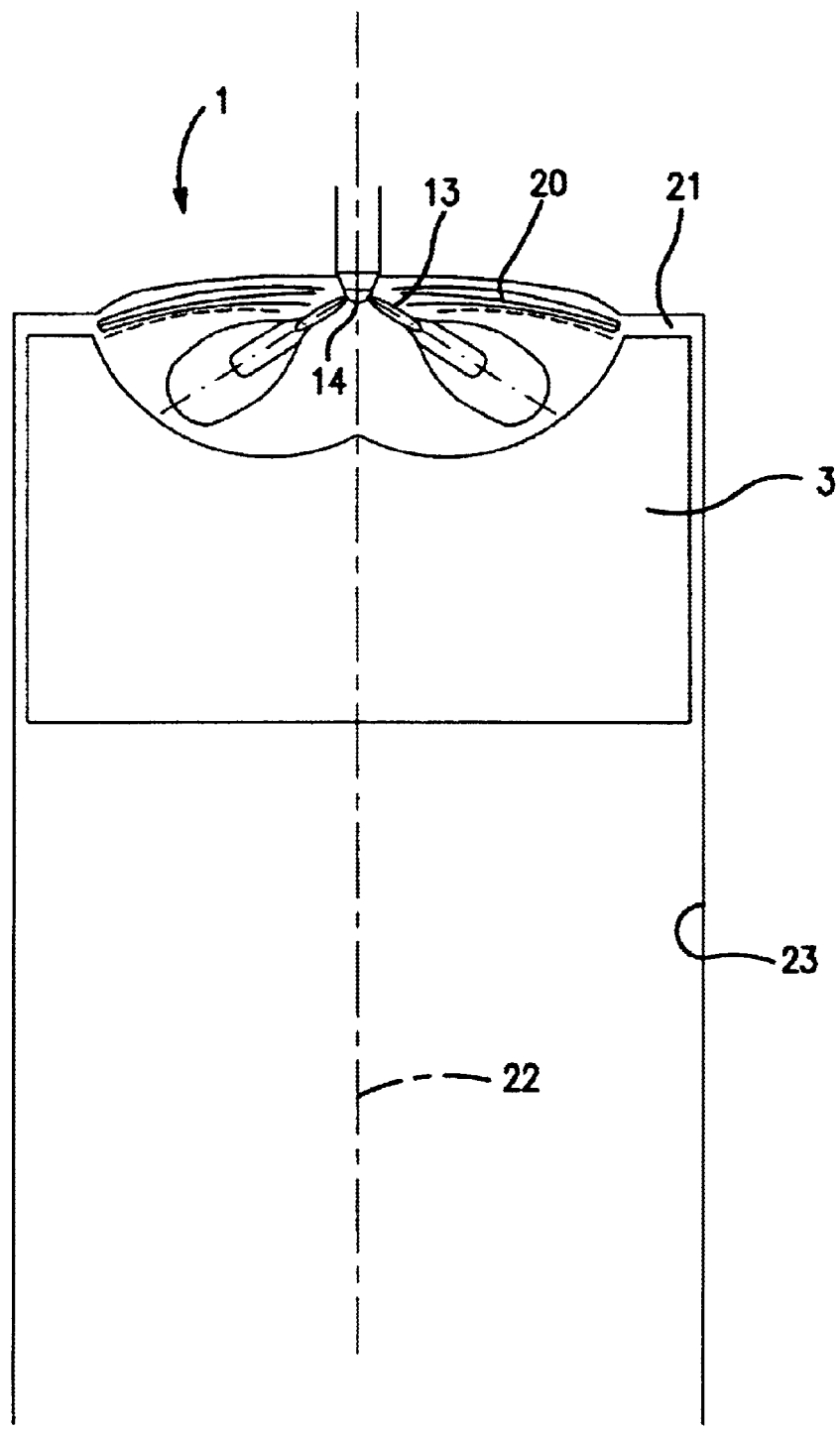
FIG. 4 shows a diagrammatic view of an injection nozzle which is provided with a plurality of openings and in which the fuel is injected into a cylinder according to the invention.
Figure 5A:
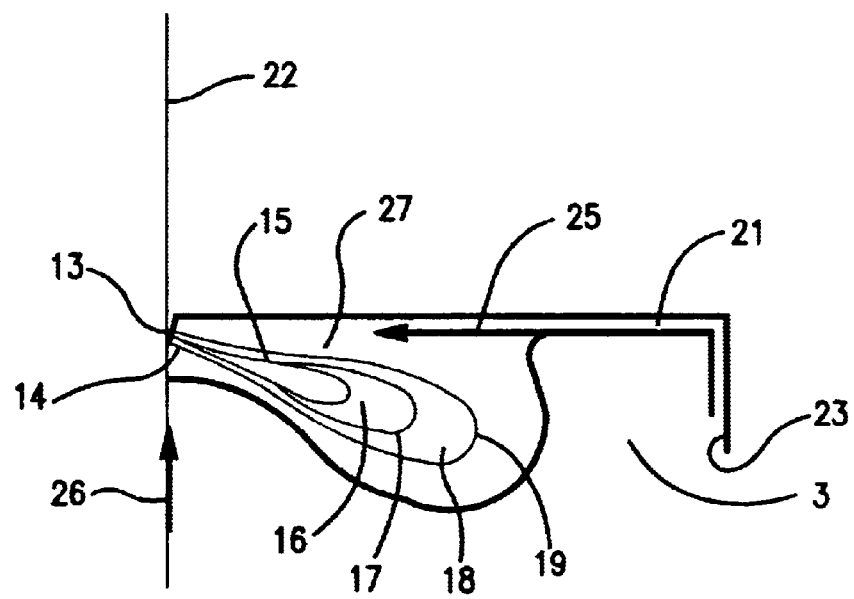
FIGS. 5a and 5b show a diagrammatic view of a spray and cylinder gas motions in the cylinder and FIG. 6 shows a chart of soot emission as a function of nitrogen oxide emission in respect of various combinations of parameters.
Figure 5B:
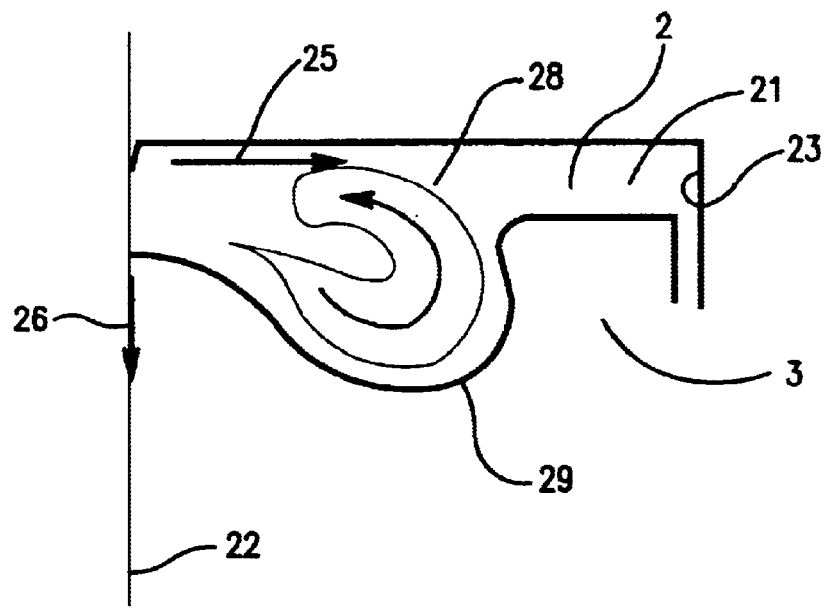

One example of the way in which the geometry of the piston can increase the gas transport into the first region 16 is that a gas motion 20, formed between the piston 3 and the cylinder 2, directs the gas in the cylinder 2 in the direction of the fuel injector nozzle 13, so as then, at the nozzle 13, to be transported by the fuel towards the burning fuel/gas mixture. FIG. 4 illustrates how a gas motion 20 is formed by the gas present in the cylinder 2 being forced out through a gap 21 between the periphery of the piston top 8 and the end of the cylinder 2 when the piston 3 is in the upper dead centre position. This gas motion 20 is referred to as "squish". FIGS. 5*a* and 5*b* further show in diagrammatic representation how the spray 27, 28 is influenced, directly before the upper dead centre position and directly after the upper dead centre position, by cylinder gas motions 25 created by the motion 26 and design 29 of the piston 3. In FIG. 5*a*, injection and spray-controlled mixing are in progress and the piston is on the way up 26. The cylinder gas which is squeezed into the gap 21 between the piston top 8 and the end of the cylinder 2 is forced to move in towards the "lift-off" region of the spray. In FIG. 5*b*, the injection is completed and remaining kinetic energy, supplied by injection of the fuel, causes the spray 28 to swing around in an upward direction due to the design 29 of the piston 3. On its way upwards, in this case, the spray 28 can meet an opposing cylinder gas current 25, the so-called "back-squish", which is created by the downward motion 26 of the piston 3. Where the spray 28 and the cylinder gas current 25 meet, a great deal of turbulence is created, which enhances after-oxidation. The piston geometry in FIGS. 5*a* and 5*b* is arbitrarily chosen. For clarification purposes, a valve arrangement is not illustrated in FIGS. 5*a* and 5*b*.

It is also possible to achieve a vortex (not shown) in the cylinder 2, the rotational axis of which coincides with the centre axis 22 of the cylinder 2, such a vortex being referred to as "swirl". This vortex can be produced by the kinetic energy of the cylinder gases during the induction stroke and/or by the motion of the piston 3 in the cylinder 2. In order to increase the turbulence in this vortex, the large-scale swirl can be broken down into turbulence by use of special protrusions or flaps (not shown) arranged on the piston 3. Swirl extends the ignition delay and prevents the fuel from reaching the walls 23 of the cylinder, thereby preventing the formation of hydrocarbons HC. Preferably, if possible, the lowest possible swirl number is chosen, for example within the range 0–0.5, but levels within the range 0.5–10 are also appropriate. Low swirl is thought to produce lower heat losses and hence better efficiency before ignition occurs, by virtue of the fact that low air motions close to walls generate less heat transfer. Low swirl is also less energy-demanding from the flow engineering aspect, i.e. the volume work of the engine during the induction stroke is lower, which also raises the overall efficiency. It should be pointed out that the method according to the invention is applicable without swirl in the cylinder 2.

By optimizing the conditions for the spray-internal mixing process and the large-scale global mixing processes, on the one hand a region 18, i.e. that in which soot is formed, is obtained which is greatly reduced in the spray whilst, at the same time, the after-oxidation of remaining soot is increased. All in all, this yields a radical net reduction in soot emissions.

In FIG. 4, an example is shown of the way in which fuel is injected into the cylinder 2. The openings 14 in the injector nozzle 13 are placed such that an essentially airborne fuel combustion is obtained, which means that the fuel is injected such that it is prevented from reaching the piston top 8 or the walls 23 of the cylinder 2. However, as has been mentioned above, a partial wall-proximate gas motion and combustion can also be chosen in order to promote global mixing and the creation of turbulence. In FIG. 4, the injector nozzle 13 has been provided with two openings 14. For clarification purposes, induction and exhaust ports have been removed from the figure.

In order to reduce the nitrogen oxide emissions (NOx) given off from the engine 1, exhaust gases from earlier combustion processes can be recirculated to the cylinder 2. The recirculated exhaust gases also help to ensure that the rate of the chemical reactions leading to ignition of the fuel is lowered, with the result that a long ignition delay is obtained. A long ignition delay is good, since more time exists for the mixing process between the fuel and the cylinder gases. In a traditional diesel engine, the mixing-in of more exhaust gases results in an increase in soot emissions, since there is a smaller concentration of oxygen in the cylinder gas. If, as described above, however, plenty of mixing energy is supplied in order to ensure that the remaining oxygen is utilized effectively, then the reduction in concentration of the oxygen has no substantial significance for the soot emissions. In other words, the nitrogen oxide emissions can thus be primarily controlled by means of the quantity of recirculated exhaust gases, broadly independently from the soot emissions. The quantity of nitrogen oxide emissions can be freely chosen by using the quantity of recirculated exhaust gases in the compressed cylinder gas for control purposes. The quantity of recirculated exhaust gases in the compressed cylinder gas can be varied between typically 0–70% (percent by volume). In order to obtain very low nitrogen emissions, the quantity of recirculated exhaust gases is preferably chosen within a 40–50 range (percent by volume). The range 0–70% relates to medium-high engine load ranges and up to maximum load. In low load ranges, still higher contents of recirculated exhaust gases can be found. The content of recirculated exhaust gases is chosen to correspond to a variation in the oxygen content from approx. 21% down to approx. 15% (percent by volume). For very low nitrogen oxide emissions, preferably close to 15%.

The high content of the recirculated exhaust gases can indirectly help to ensure a reduction in the formation of soot particles. As has been described above, high-intensity turbulence is created during the combustion process, which, in turn, leads to such a high mixing rate between the fuel and the cylinder gases that soot formation cannot take place provided that the local fuel/gas mixture has a sufficiently low fuel excess. The effect of a high mixing rate is dependent upon the rate of the chemical reactions generated during the combustion process. The effect of the high mixing rate upon the soot particle formation is greater with slower chemical reactions, which leads to low soot particle formation.

Other methods for increasing the ignition delay are to inject the fuel late in relation to the upper dead centre position. When the fuel is injected this late, the compression temperature has dropped and the pressure in the cylinder 2 decreased, which contributes to the late ignition time. It is also possible to increase the ignition delay by cooling the cylinder gases before their introduction into the cylinder 2. By lowering the compression ratio, an increased ignition delay is also obtained. For best stability and robustness in the combustion process, an increased mixing intensity is preferred, however, to extended ignition delay. One reason is that increasing ignition delay produces an ever increasing fuel proportion, which can be mixed with the cylinder gas in a haphazard manner. The combustion in a piston engine 1 is, of necessity, turbulent, which means that the likelihood of variances in different processes is therefore high. Spray-controlled combustion is, from experience, relatively stable. Another reason is that an increase in the ignition delay means an exponentially increasing risk of instabilities in the ignition process, which, in the worst case, can lead to total loss of ignition. A critical duration for the ignition delay is when the natural fluctuations in the ignition delay have become so great that spontaneous misfirings occur.

The spray-internal mixing process is primarily controlled by the flow rate and the shape of the spray, but also by the gas state and the content in the cylinder (2) of exhaust gases which are recirculated to the cylinder (2) from earlier combustion processes.

With the method according to the invention, a combustion process is obtained which produces low emissions throughout the working range of the engine, from low to high load, and also during transient processes, such as, for example, accelerations. The reason is that the combustion is spray-controlled and is realized continuously, which allows good control of maximum cylinder pressure and pressure gradients. In practical trials, nitrogen oxide contents and soot particle contents have been obtained which only amount to one-tenth of what might best be expected of a conventional diesel engine with spray-controlled diffusion combustion. Examples of measured nitrogen oxide contents and soot particle contents obtained are 0.05–0.6 grammes/kWh and 0–0.07 grammes/kWh respectively.

Figure 6:
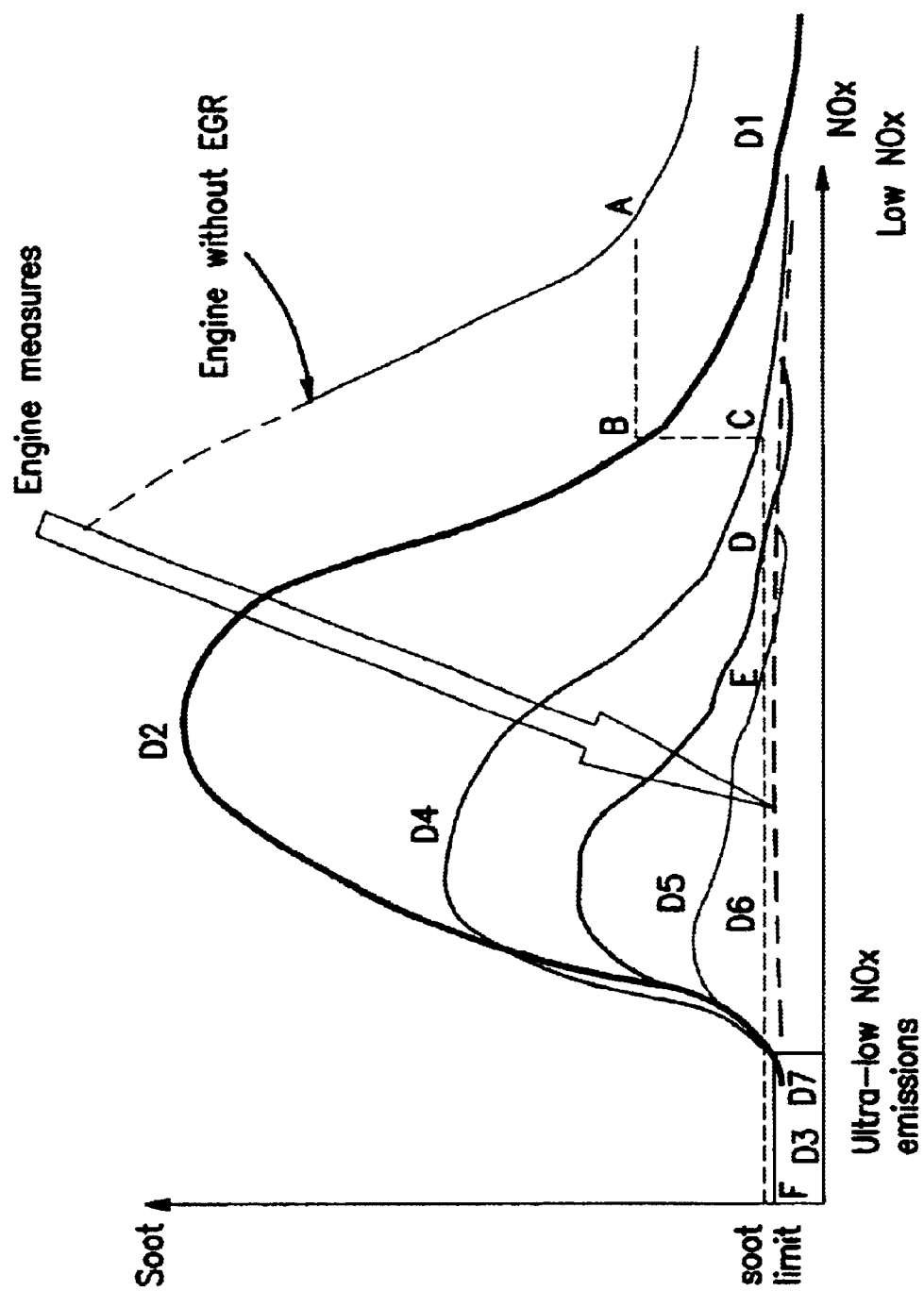

The method according to the invention offers two different ways of arriving at ultra-low soot and nitrogen oxide emissions. This will be illustrated by FIG. 6. The chart in FIG. 6 shows diagrammatically how the soot emissions and the nitrogen oxide emissions are interdependent. The x-axis shows the quantity of soot emissions and the y-axis shows the quantity of nitrogen oxide emissions. The references A, B, C, D, E and F show where on the chart corresponding current and future legal requirements, as regards soot and nitrogen oxide (Nox) emissions, are found.

A corresponds to the emission levels and legal requirements of today's diesel engines.

B corresponds to us02, i.e. NOx is halved, whilst soot levels are maintained.

C corresponds to euro4, i.e. NOx is maintained and soot is reduced to ¼ compared with us02.

D corresponds to an assumed euro5, i.e. NOx is halved compared with euro4.

E corresponds to an assumed euro5+, i.e. NOx is halved again compared with euro5.

F corresponds to us07, i.e. NOx is reduced by a factor of 10 compared with euro5+.

The rectangular region in the extreme bottom left of the chart in FIG. 6 illustrates the future ultra-low emission requirements, i.e. F. The references D1 to D7 in the chart illustrate different ways of controlling the combustion process in a diesel engine in order to attain the different emission requirements. The large arrow labelled "engine measures" in the chart shows how the soot hump is depressed to ultra-low levels with the various technical steps.

D1 corresponds to current technology. The soot emissions are relatively low and the nitrogen oxide emissions are medium-high.

D2. Here the exhaust gas recirculation has been increased. The engine configuration is the same as in D1. The nitrogen oxide emissions decrease with increasing exhaust gas recirculation, whilst the soot emissions rise in level due to lower oxygen concentration. The soot emission requirement for B is passed.

D3 Here the exhaust gas recirculation is further increased and/or the start of injection is postponed. Both extend the global ignition delay so much that all the fuel has time to be injected before ignition occurs. This produces sufficient mixing to attain ultra-low emissions, i.e. F. This represents the first way of attaining F.

D4 Engine measures of the higher injection pressure type produce a lower smoke hump. The nitrogen oxide emissions are capable of being lowered to C. Extended global ignition delay, i.e. where all the fuel is injected before being ignited, is not used here.

D5 Further measures, which increase the turbulence, have virtually minimized the soot hump. The nitrogen oxide emissions are now capable of being lowered to E. Here too, there is no use of extended global ignition delay.

D6 The end objective is that the soot hump should be totally damped out by use of engine measures. The engine measures which are required here are more advanced and, apart from high injection pressure, can also constitute variable valve times, variable compression and re-optimization of the other design parameters of the combustion concept, such as piston geometry and injection system. When the soot emissions have been lowered to ultra-low levels, the level of nitrogen oxide emissions can be chosen totally freely, with sustained low soot level. This corresponds to moving along the dashed line, parallel with the x-axis, farthest down on the chart. In D6, there is no use made of extended global ignition delay, but rather ultra-low emissions continue to be attained purely by way of spray-controlled combustion.

D7 Here ultra-low emissions are obtained with spray-controlled combustion and with relatively early injection start. Good efficiency and robustness have been achieved. This represents the second way of attaining F.

The method according to the invention also has the effect that the nitrogen oxide content produced during the combustion process, the soot particle content and the efficiency of the engine 1 can be controlled essentially independently of one another. This helps to ensure that the engine can be run over the whole of the working range of the engine and that ultra-low emissions can be achieved over the whole of the working range of the engine. The nitrogen oxide content produced during the combustion process is primarily dependent on the proportion of recirculated exhaust gases to the cylinder 2. The nitrogen oxide content can thereby be controlled, as mentioned above, with the aid of the exhaust gas recirculation, with the result that an essentially optional nitrogen oxide content can be achieved.

The soot particle content produced during the combustion process is dependent on the flow rate and the shape of the fuel injected through the fuel injector nozzle 13 and on the mixing process between the fuel and cylinder gases, both globally and locally, which the flow rate and shape of the fuel create in the cylinder 2. The flow rate and the shape of the fuel injected through the fuel injector nozzle 13 are dependent, in turn, on the pressure at which the fuel is injected into the cylinder 2 and the shape of the openings 14 in the fuel injector nozzle 13. The abovementioned squish and swirl also influence the mixing process between the fuel and the cylinder gases. The soot particle content can thus be controlled by means of the pressure of the injected fuel, the number, direction and shape of the openings 14 in the injector nozzle 13 and the large-scale global cylinder gas motions created in the cylinder, i.e. squish and swirl and combinations thereof. Here, varying the shape of the openings 14 also means that the size of the openings 14 can be varied.

The efficiency of the engine 1 is controlled by heat release, its shape and duration. This is influenced by both the injection pattern of the fuel, above all the time when injection starts, and by the composition and state of the cylinder gases, as well as by the geometry of the system described in terms of number of holes, spray direction and geometry of the combustion chamber. By duration of the heat release is meant the time span during which heat is released during the combustion process in the cylinder 2. In addition, the efficiency of the engine is influenced by the heat losses of the system to surrounding cylinder walls. The heat losses can be influenced with the same parameters as stated above. The fuel can therefore be injected into the cylinder 2 at a certain time and for a certain time span, so that the efficiency of the engine 1 can thereby be controlled. A suitable time for commencing the injection of the fuel into the cylinder (2) is at a crankshaft angle of 20° before to 20° after the upper dead centre position.

The method according to the invention allows the parameters nitrogen oxide emission, soot emission and efficiency to be controlled largely independently of one another, i.e. allows nitrogen oxide emissions to be primarily controlled by the quantity of recirculated exhaust gases, soot emissions to be primarily controlled by use of the injection pressure, and efficiency to be primarily controlled by use of the time at which the injection starts during a combustion cycle.

This applies to a given engine build. If variable compression and/or variable valve times are added, the state of the cylinder gas can be manipulated, thereby offering new prospects for improvement, both when viewed as a basic engine and when operating in actual running, with the parameters as stated above. With the method according to the invention, it is simultaneously possible to optimize the compression ratio for best efficiency, independently from the three main parameters above. The advantage with such a method is that it then becomes possible, with regard to robustness, controllability and efficiency, to once again dome close to today's known diesel process (mixture-controlled diesel flame) in terms of efficiency, i.e. more than 45% efficiency and full controllability from combustion cycle to combustion cycle.

The method according to the invention has the effect that the time at which the fire is ignited can be very accurately controlled and that transient processes, for example during acceleration, can be controlled in order to obtain low emissions. With the fuel being ignited and already starting to burn during the injection period and continuing to be combusted even after the end of the injection period, not all the fuel injected during an injection cycle is burnt at once (cf. the prior art). A smoother and sufficiently slow pressure build-up with an acceptable peak pressure is obtained in the cylinder, thereby alleviating the is strength problems.

It is also possible to realize the method according to the invention by connecting an exhaust-gas turbo or a compressor (not shown) to the combustion engine 1. In the above, a combustion engine 1 has been discussed which works according to the four-stroke principle. The method according to the invention is also applicable to a combustion engine which works according to another principle, such as according to the two-stroke, six-stroke or eight-stroke principle. Six-stroke and eight-stroke can be achieved, for example, by virtue of one or two extra compression cycles, without fuel being injected into the cylinder in order thereby to obtain special properties for the gas mixture fed into the cylinder 2. Where the method according to the invention is applied, for example, to a free-piston engine which does not have a crankshaft, crank angle degrees quoted in this document are converted to corresponding distances in this type of engine.

The combustion engine 1 can also be provided with induction and exhaust valves 10, 12, which can be controlled so that the opening and closing times of the valves 10, 12 can be varied. A thermodynamic manipulation of gas state and turbulence in the cylinder 2 can thus be achieved by appropriately opening and closing the valves 10, 12. With variable opening and closing times of the induction and exhaust valves 10, 12, it is possible to influence the effective compression ratio.

Variable compression ratio is a technique which powerfully influences the gas state and which can be optimized right across the range of engine speed and torque. Such an engine can effectively be optimized for best possible efficiency and for other properties of the invention, for example regarding emissions.

The fuel type which is used to realize the method according to the invention can be constituted by conventional diesel oil. Other fuel types are also usable. By using a fuel type having a low heat content or a conventional diesel oil having additives which lower the heat content, increased turbulence can be created in the injected fuel as a result of relatively more fuel having to be injected into the cylinder 2. Other fuel-specific properties, such as vaporization curve, oxygen content, cetane number, etc., can also be used to optimize the combustion process. It is further possible to mix the fuel with, for example, water or other substances. Mixing water with the fuel gives a very rapid vaporization process and hence a rapid homogenization of the spray. The faster vaporization process is due to the fact that water in the fuel is vaporized directly after the injection, thereby producing a local pressure wave which speeds up the atomization process of the fuel. At the same time, vaporization heat is taken from the environment, thereby lowering the flame temperature. Water, which contains oxygen, is in this case transported into the combustion chamber in the direct vicinity of the fuel, which also offers the potential for low soot formation and/or effective soot oxidation. Water injection can be arranged by use of a separate atomizer in the cylinder to increase controllability and influence the mixing process and the ignition delay.

A large number of small injection holes in the injection device 13 produce good local mixing but poor global mixing of fuel/cylinder gases. A small number of large holes, on the other hand, produces poor local mixing but good global mixing.

In order further to reduce the emissions given off from the combustion engine, the exhaust gases of the engine can be after-treated with a catalyzer. If the engine is controlled such that ultra-low levels of nitrogen oxide and soot particles are formed during the combustion process, an oxidizing oxidation catalyzer can be coupled to the exhaust system in order to reduce hydrocarbon compounds and carbon monoxide which are given off from the engine.

The method according to the invention can be combined with devices for igniting the fuel in addition to compression ignition. It is possible, for example, in a given instance, to ignite the fuel/cylinder gas mixture by means of microwaves or a plasma jet, this on condition that the fuel/cylinder gas mixture is not previously ignited by compression heat.

Cooler induction air produces lower compression temperatures, i.e. this is critical for, inter alia, the ignition time. Various ways of cooling and regulating induction air, i.e. induction air also with mixed-in recirculated exhaust gases, are therefore advantageous when using the method according to the invention.

For each technical step which is made within this invention, the gas-exchange system of the engine is jointly optimized to attain the desired charging pressure, exhaust counter-pressure, charging temperature, the quantity of recirculated gases, and global fuel/air ratio.

What is claimed is:

1. Method for controlling the combustion process in a combustion engine, comprising at least one cylinder, at least one piston which reciprocates in the cylinder, and is set to reverse in the cylinder at an upper and lower dead center position, and at least one fuel feed device disposed in the cylinder, the method comprising:

injecting through said at least one fuel feed device a fuel mixture directly into the cylinder with high kinetic energy such that the fuel or the fuel mixture, on its way into the cylinder, forms a spray and is mixed with cylinder gas compressed in the cylinder forming a fuel/gas mixture;

igniting said fuel/gas mixture by compression heat generated in the cylinder only after an at least local mixing of fuel and cylinder gas has occurred;

wherein the spray, during the injection step, supplies kinetic energy and controls a spray-internal mixing process between the fuel, or the fuel mixture, and the cylinder gas, and supplies kinetic energy to a large-scale global mixing process; and supplying further kinetic energy to the spray-internal and to the global mixing process as a result of the motion and/or design of the piston.

2. The method according to claim 1, further comprising controlling essentially independently of each other soot and nitrogen oxide emissions generated during the combustion process and the efficiency of the engine, the soot emissions being primarily controlled by the quantity of supplied kinetic energy to the mixture, the nitrogen oxide emissions being primarily controlled by the quantity of exhaust gases from earlier combustion processes, and the efficiency being primarily controlled by the center of gravity in the combustion chamber and the duration of heat release.

3. The method according to claim 1, wherein the gas compressed in the cylinder contains, for an optional quantity of nitrogen oxide emission, a certain proportion of exhaust gases from earlier combustion processes which have been recirculated to the cylinder in accordance with a variation in the oxygen content from about 21% down to about 15%.

4. The method according to claim 1, wherein the injection pressure of the fuel feed device is higher than 300 bar.

5. The method according to claim 4, wherein the injection pressure of the fuel feed device is between 1000 and 3000 bar.

6. The method according to claim 1, further comprising controlling the injection pressure such that the injection pressure varies during the injection of the fuel or the fuel mixture into the cylinder.

7. The method according to claim 1, wherein the fuel or the fuel mixture is injected such that the fuel or the fuel mixture, at the start of the injection, is injected at the maximum pressure generated during the entire injection.

8. The method according to claim 1, wherein as a result of the motion and design of the piston, kinetic energy is supplied during an expansion phase, to the large-scale global mixing process.

9. The method according to claim 1, wherein the fuel or the fuel mixture is injected through nozzles of round, elliptical, or other suitable shape having a size of about 0.05–0.40 mm.

10. The method according to claim 1, wherein injection of the fuel or the fuel mixture into the cylinder is begun, when applied to a combustion engine with crankshaft, at a crankshaft angle of approximately 20° before to approximately 20° after the upper dead center position.

11. The method according to claim 1, wherein the mixing is carried out locally, since fuel or the fuel mixture and the cylinder gas are mixed in regions upstream of the regions in the spray where combustion takes place and since the injection continues after ignition has been realized.

12. The method according to claim 11, further comprising controlling the local mixing during the injection period by the distance between the fuel feed device, and where the fuel/gas mixture principally burns, and said distance being controlled by the kinetic energy and the turbulence in the spray and the shape of the spray which leaves the fuel feed device, and by the content of exhaust gases in the cylinder which is recirculated to the cylinder from earlier combustion processes.

13. The method according to claim 1, wherein the mixing is carried out globally since essentially the entire quantity of fuel corresponding to one combustion cycle is injected and mixed in the cylinder before ignition and combustion are realized.

14. The method according to claim 1, wherein the gas motion is formed by the gas present in the cylinder being forced out through a gap between the periphery of a piston top and one end of the cylinder, when the piston is in the upper dead center position.

15. The method according to claim 1, wherein a swirl motion is generated in the cylinder.

16. The method according to claim 1, further comprising supplying further kinetic energy to the mixture through a post-injection.

* * * * *